United States Patent [19]

Sarabhai

[11] Patent Number: 5,087,470
[45] Date of Patent: Feb. 11, 1992

[54] LEGUME PASTA AND ITS METHOD OF PREPARATION

[76] Inventor: Anand Sarabhai, 222 Bowery, Room 2-B, New York, N.Y. 10012

[21] Appl. No.: 667,421

[22] Filed: Mar. 11, 1991

[51] Int. Cl.$^5$ ............................ A23L 1/16; A23L 1/20
[52] U.S. Cl. ..................................... 426/557; 426/451; 426/634
[58] Field of Search ................... 426/634, 557, 451

[56] References Cited

U.S. PATENT DOCUMENTS

| | | | |
|---|---|---|---|
| 1,570,443 | 1/1926 | McSorley . | |
| 2,037,042 | 4/1936 | Perewe | 99/85 |
| 2,278,468 | 4/1942 | Musher | 426/634 |
| 3,162,536 | 12/1964 | Kaufmann | 99/85 |
| 3,489,571 | 1/1970 | Hannum | 426/634 |
| 4,084,016 | 4/1978 | Kon et al. | 426/634 |
| 4,124,727 | 11/1978 | Rockland et al. | 426/634 |
| 4,233,322 | 11/1980 | Fritze | 426/634 |
| 4,435,435 | 3/1984 | Hsu | 426/557 |
| 4,517,215 | 5/1985 | Hsu | 426/557 |
| 4,705,693 | 11/1987 | Mitra et al. | 426/634 |
| 4,748,037 | 5/1988 | Matsumoto et al. | 426/634 |
| 4,810,517 | 3/1989 | Glittenberg et al. | 426/634 |
| 4,956,190 | 9/1990 | Chawan et al. | 426/269 |

Primary Examiner—Donald E. Czaja
Assistant Examiner—Mary S. Mims
Attorney, Agent, or Firm—Scully, Scott, Murphy & Presser

[57] ABSTRACT

A non-wheat containing pasta product prepared from urad legumes. Optionally, other legumes and/or non-wheat cereal grains may be combined with the urad legumes.

29 Claims, No Drawings

LEGUME PASTA AND ITS METHOD OF PREPARATION

BACKGROUND OF THE INVENTION

1. Field of the Invention

This invention relates to pasta and its method of preparation. More particularly, this invention relates to non-cereal grain pasta and its method of preparation, especially to legume pasta and its method of preparation.

2. Description of the Prior Art

Pastas, such as spaghetti, linguini, ravioli, ziti, tortellini, noodles and the like, form a significant part of the diet of many people. Pastas, also known as alimentary paste foods, are conventionally prepared from wheat-based flour, especially seminola flour obtained from durum wheat. Such food products are high in starch but low in protein and dietary fiber.

With an increasing concern by many people of the need for nutritional diets high in protein, dietary fiber and iron and the attendant efforts to provide more nutritional food products in the marketplace, more nutritious pasta products having, for example, reduced starch content, have been the subject of the prior art.

Nutritionally improved pasta products have been prepared by replacing the wheat, in whole or in part, in the pasta flour or dough with materials derived from various vegetables. U.S. Pat. No. 2,037,042 of Perewe discloses a complete non-wheat pasta product prepared from potato flour, while U.S. Pat. No. 3,162,536 of Kaufmann employs low protein starchy flours including manioc tubers, peanuts, chestnuts and potatoes to prepare alimentary paste foods, and U.S. Pat. No. 4,435,435 of Hsu discloses a non-wheat containing rice flour pasta. U.S. Pat. No. 1,570,443 of McSorley discloses a pasta prepared from a mixture of soybean and wheat flour, while U.S. Pat. No. 4,956,190 of Chawan, et al. discloses a pasta flour prepared from grains and legumes wherein, prior to milling, the edible grains and legumes are tempered in the presence of a reducing agent which is said to produce an improvement in color retention of the resulting flour.

Pasta dough, prepared from the pasta flour, must exhibit a particular binding quality to prevent a breaking apart of the pasta during cooking and to provide a cooked pasta product of the proper texture. Wheat employed for conventional pasta inherently provides the required binding to the pasta dough. Heretofore, vegetable pasta products with satisfactory cooking quality and texture could not be prepared by conventional methods when no or substantially no wheat flours were added. U.S. Pat. No. 4,517,215 of Hsu observed that this was apparently due to the difference in the type and quantity of protein in the vegetables employed as compared to semolina, durum flour or regular wheat flour. Semolina and durum wheat contain about 12-14% protein which is mostly gliadin and glutenin and which was believed to contribute to the pasta cooking and texture qualities. Most of the protein in pea, bean and potato is globulin, while corn contains albumin and globulin. Further, vegetables, such as corn and potato, can be classified as being of low protein content, i.e., 7-8%, while bean and peas are considered high protein vegetables, i.e., 20-24%. Since vegetables have a different type and quantity of protein as compared to the wheat flour employed in pasta, vegetable pastas are of poor quality and tend to break apart after cooking. The '215 patent of Hsu states that the cooking and texture problem of vegetable pasta can be significantly flour where they apparently function as binding agents. This patent discloses a vegetable pasta containing a seed or tuberous vegetable in particulate form, sodium or potassium alginate, propylene glycol alginate and starch. Tuberous vegetables are disclosed as including potatoes and sweet potatoes while seed vegetables are disclosed as including corn, peas, lentils and beans, such as mung beans, soy beans, kidney beans and pinto beans. The use of the tuberous or seed vegetables in the '215 patent always requires the addition of alginates. Example 3 illustrates a completely wheat-free pea pasta which requires the use of alginates to provide a satisfactory cooked product.

In view of the increased interest in a more nutritional diet and especially a diet free from chemical additives and preservatives, the need exists to provide pasta products which have improved nutritional properties, especially those high in protein, dietary fiber and iron. Further, since a significant portion of the population is allergic to wheat and, therefore, cannot enjoy the pleasures of eating pasta, a need exists to provide a pasta containing no wheat.

It is an object of this invention to provide pasta products high in nutritional value.

It is another object of this invention to provide non-wheat based pasta products.

It is a further object of this invention to provide pasta products prepared from legumes without any additional source of non-leguminous starch or binding agents.

The achievement of these and other objects will be apparent from the following description of the subject invention.

SUMMARY OF THE INVENTION

In accordance with the present invention, a nutritional non-wheat pasta product is prepared from flour of a particular legume, known as urad. More particularly, this invention relates to a process of preparing a pasta product comprising:

(a) comminuting urad legumes to produce a flour,
(b) admixing the flour with a quantity of water effective to produce a malleable dough,
(c) subdividing the dough to maintain said dough in a malleable condition,
(d) forming the dough into a pasta shape, and
(e) drying the formed dough to produce a pasta product containing no wheat flour.

The subject invention also relates to the pasta product prepared by this described process. Further, the invention relates to a pasta product of urad alone or admixed with (a) any non-urad legume or a mixture of non-urad legumes, and/or (b) a non-wheat cereal grain or a mixture of non-wheat cereal grains in flour form, sufficient water to produce a pasta product and containing no wheat flour, and no additives other than preservative or flavoring additives.

DESCRIPTION OF THE PREFERRED EMBODIMENTS

The present invention relates to improvements in pasta products so as to provide pastas of high nutritional value. In addition, the legume pasta of the subject invention is especially attractive to people with wheat allergies or to those who desire to limit their diet to macrobiotic foodstuffs. The pasta of the subject invention containing 100% urad legumes or a combination of urad legumes and other legumes is high in protein, dietary fiber and iron and cooks in approximately 1-2 minutes as compared to 5-10 minutes required for wheat-based pasta. Further, the legume pasta maintains its structure in soup products for a long time and may be cooked in a microwave oven or even roasted or fried to provide a cracker or chip-like product.

Since legumes constitute a very large class of plants and, furthermore, are grown throughout the world, the harvested products obtained from legume plants are identified by a variety of names depending on locale. Therefore, to avoid confusion, the term legume or legumes, as used herein, refers to the fruit or seed of leguminous plants and identified in various parts of the world by such common names as beans, lentils, peas or pulses. Particularly useful in the preparation of the products of the subject invention is the legume known as urad. Other common names for urad include udad, arhar and black gram. Urad is identified by the botanical name *Phaseolus mungo* in some texts, while other texts identify urad as *Vigna radiata* or *Phaseolus radiatus*. The legume particularly preferred in the practice of this invention is urad. In fact, the pastas of this invention require the use of urad to assure the binding quality of the dough, the cooking properties and the cooked product texture necessary to provide acceptable pasta products.

Pasta products of the invention can be prepared from legume flour of 100% urad. In one embodiment, the legume flour for the pasta products of this invention can be prepared from a combination of any legumes, provided at least about 10 wt. %, preferably about 10 to about 25 wt. %, of the flour is urad, i.e., urad legume is combined with a non-urad legume or with a mixture of non-urad legumes. (Hereinafter, and for simplicity, when referring to urad legumes alone and a mixture or combination of urad legumes and other legumes, the term "urad" may be employed to indicate urad legumes, and the term "urad/legume" may be employed to indicate a mixture or combination.)

Although the prior art discloses vegetable-based pasta, including those made from legumes, additions of other materials are required in these prior art pastas to provide a satisfactory product. Thus, additional sources of starch or additives, such as alginates, have been required as being necessary to prepare a satisfactory pasta product when non-wheat flour is employed. In addition, other pasta products have been prepared where the pasta flour is prepared from a combination of wheat and non-wheat vegetable sources. The product of the present invention does not require the use of additives (other than those which may optionally be added for texture or taste) or the addition of wheat flour to provide a nutritional and tasteful pasta product. The urad legume provides the pasta product of this invention with the necessary binding quality and the firm, smooth texture obtained when it is cooked.

The urad legumes or the combination of urad legumes and other legumes are ground or comminuted into a fine flour either before or after husking. Stone ground crushing is preferred to hammer mill crushing, since the latter cuts the legumes. Alternatively, urad flour can be combined with the flour of one or more non-urad legumes by employing conventional bakery or home mixing equipment. Cold water is gradually added to the flour to provide no more than 30% by weight of the total mixture, depending on the humidity of the surroundings. Conventional mixing equipment for mixing dough, such as a screw type mixer or a hammer mill mixer may be employed. Soda, salt and asafoetida, a natural seasoning, can be added, as desired, to provide texture, taste and preservation. Since the dough can become extremely hard upon standing and, thus, difficult to form into desired pasta shapes, the mixing of the dough in a hammer mill or a ball mill or by repeated passes through a series of rollers is critical to provide and/or maintain the dough in the desired consistency.

Variations in flavor and taste can be readily accomplished by admixing flours from other legumes with the dough as well as any spices or flavorings required to provide the desired taste or flavor. Such additives and seasonings as black pepper, red chile, green chile, cilantro, fenugreek, coriander and the like may be admixed with the urad or urad/legume flour to provide a seasoned pasta.

The dough can be compacted and rolled into sheets to a thickness of about 0.3 to 1 mm and then cut into strips in a pasta machine known in the art to provide fettucine, or cut into squares for lasagne, or fashioned into other pasta shapes as desired. Conventional pasta machines known in the art may be used. The final product is prepared by drying the wet pasta in a conventional pasta dryer.

In another embodiment, urad legumes may be combined with non-leguminous sources to provide a non-wheat pasta. Specifically, non-wheat cereal grains may be substituted for the non-urad legumes in the above-described procedures to prepare pasta products. Such non-wheat cereal grains as rye, barley, oats, corn, buckwheat, amaranth, millet and the like and mixtures thereof may be combined with urad legumes and ground or comminuted into flour, or flour of these non-wheat grains may be combined with urad flour to prepare a non-wheat pasta. As with the non-urad legumes, these pasta products must contain at least about 10 wt. %, preferably about 10 to about 25 wt. % of urad legumes. One skilled in the art, following the procedures described above, can prepare these pastas.

In a further embodiment and by following the above-described procedures for preparing the pastas of the subject invention, urad may be combined with (a) a non-wheat cereal grain or a mixture of non-wheat cereal grains and (b) a non-urad legume or a mixture of non-urad legumes to provide another type of non-wheat pasta. By combining at least about 10 wt. % urad, preferably about 10 to about 25 wt. %, with one or more non-wheat cereal grains and one or more non-urad legumes and grinding or comminuting into flour or by combining urad flour with flour of one or more non-wheat cereal grains and one or more non-urad legumes, a satisfactory and nutritious non-wheat pasta can be prepared. The procedure described above for preparing urad pasta can also be employed by one skilled in the art to prepare these pastas.

The urad and the urad/legume pasta products of this invention cook in 1-2 minutes whereas wheat-based pasta requires five times as long. On the other hand, whole lentils and beans require 20-100 times as long to prepare. The urad-containing pasta of the invention can also be prepared for serving without cooking in boiling water by marinating it in lemon juice which prevents the destruction of any heat-sensitive nutrients present in the product.

The cooked pasta product of this invention may be served either in its plain or seasoned form in a pasta salad or with a light tomato sauce, butter, oil or cheese, while in its plain form it may be served with any of the conventional tomato-based or white pasta sauces.

The dough may also be fashioned in disks of 4-8" in diameter, boiled for approximately one minute and handled with ease as a substitute for crepes or pancakes. The subject pastas can be added to soups and will maintain their consistency therein for extended periods of time. The pastas of the invention can also be prepared by cooking in a microwave oven or roasted and fried to provide crackers and chips.

Products of the invention are 100% leguminous pasta made from urad legumes, a 100% leguminous pasta made from a mixture of urad and other legumes, a urad-based pasta containing non-wheat cereal grains and a urad-based pasta containing a mixture of non-urad legumes and non-wheat cereal grains. These pasta products are high in protein, dietary fiber and iron and low in starch. Such pasta products, therefore, are particularly useful in the diet of people with wheat allergies or by those who desire or require a macrobiotic diet. Further, these products are especially useful by campers and backpackers because the products cook in a very short time and have a high nutritional value.

The invention is further demonstrated by the following illustrative examples.

A quantity of urad legumes was crushed by stone grinding to form a fine flour. Cold water was gradually added to the flour with mixing to form a malleable dough. The dough was compacted, passed through a series of rollers to maintain its consistency, and then introduced into a pasta machine to form fettucine which was dried in a pasta dryer. The non-wheat containing fettucine was cooked in boiling water for 1-2 minutes and subject to organoleptic testing.

In a similar fashion, fettucine of other legumes and non-wheat cereal grains and fettucine of mixtures of urad legumes and other legumes and urad legumes and non-wheat cereal grains were prepared, cooked and tested.

The results are presented below:

| Ex. | Nature of Pasta Flour (wt. %) | Cooking Properties | Texture of Cooked Product |
|---|---|---|---|
| 1 | 100% urad | Good | Firm/Smooth |
| 2 | 100% mung beans | Broke apart | Pasty/Mealy |
| 3 | 100% chick peas | Broke apart | Pasty/Mealy |
| 4 | 100% tuver lentils | Broke apart | Pasty/Mealy |
| 5 | 100% pinto beans | Broke apart | Pasty/Mealy |
| 6 | 100% millet | Broke apart | Pasty/Mealy |
| 7 | 100% corn | Broke apart | Pasty/Mealy |
| 8 | 90% mung beans/10% urad | Good | Firm/Smooth |
| 9 | 90% chick peas/10% urad | Good | Firm/Smooth |
| 10 | 90% tuver lentils/10% urad | Good | Firm/Smooth |
| 11 | 90% pinto beans/10% urad | Good | Firm/Smooth |
| 12 | 80% millet/20% urad | Good | Firm/Smooth |
| 13 | 75% corn/25% urad | Good | Firm/Smooth |

Each of the legume pastas of Examples 1, 8, 9, 10, 11, 12 and 13 contained at least 10% udad legumes and no wheat flour, in accordance with the subject invention, and each provided a satisfactory cooked pasta product with a firm, smooth texture. The pastas of Examples 2, 3, 4 and 5, which were prepared from legume flour and no wheat flour, and the pastas of Examples 6 and 7, which were prepared from non-wheat cereal grains and no wheat flour, did not contain any urad legumes. When cooked, each of these six pastas broke apart, and each of the six cooked products was pasty and mealy and, thus, unsatisfactory.

Modifications and variations of the invention as hereinbefore set forth may be made without departing from the spirit and scope thereof. Therefore, only such limitations should be imposed on the invention as are indicated in the appended claims.

What is claimed is:

1. A process of preparing a pasta product comprising:
   (a) comminuting urad legumes to produce a flour,
   (b) admixing the flour with a quantity of water effective to produce a malleable dough,
   (c) subdividing the dough to maintain said dough in a malleable condition,
   (d) forming the dough into a pasta shape, and
   (e) drying the formed dough to produce a pasta product containing no wheat flour.

2. A process according to claim 1 where in step (a), any one of the following is admixed with the urad legumes and subjected to comminuting:
   (1) a non-urad legume or a mixture of non-urad legumes, or
   (2) a non-wheat cereal grain or a mixture of non-wheat cereal grains, or
   (3) a mixture of (i) a non-urad legume or a mixture of non-urad legumes and (ii) a non-wheat cereal grain or a mixture of non-wheat cereal grains.

3. A process according to claim 2 wherein the flour contains at least about 10 wt. % urad legumes with the balance of the flour being non-urad legumes and/or non-wheat cereal grain.

4. A process according to claim 3 wherein the flour contains about 10 to about 25 wt. % urad legumes.

5. A process according to claim 1 wherein the quantity of water is no more than 30 wt. % of the dough.

6. A process according to claim 1 where in step (b) salt, baking soda, asafoetida or mixtures thereof are admixed with the flour.

7. A process according to claim 6 wherein the salt is 0 to about 10 wt. %, the baking soda is 0 to about 10 wt. % and the asafoetida is 0 to about 10 wt. % of the dough.

8. A process according to claim 1 wherein the subdividing of step (c) is conducted by passing the dough through a ball mill, a hammer mill or through rollers.

9. A process according to claim 1 wherein the pasta shape and the pasta product is spaghetti, linguini, ziti, ravioli or tortellini.

10. A process of preparing a pasta product comprising:
    (a) admixing flour of urad legumes with a quantity of water effective to produce a malleable dough,
    (b) subdividing the dough to maintain said dough in a malleable condition,
    (c) forming the dough into a pasta shape, and
    (d) drying the formed dough to produce a pasta product containing no wheat flour.

11. A process according to claim 10 where in step (a), any one of the flours listed herein is admixed with the flour of urad legumes and water:
    (1) flour of non-urad legume or of a mixture of non-urad legumes, or
    (2) flour of a non-wheat cereal grain or of a mixture of non-wheat cereal grains, or
    (3) flour of a mixture of (i) a non-urad legume or a mixture of non-urad legumes and (ii) a non-wheat cereal grain or a mixture of non-wheat cereal grains.

12. A process according to claim 11 wherein the flour contains at least about 10 wt. % urad legumes with the balance of the flour being non-urad legumes and/or non-wheat cereal grain.

13. A process according to claim 12 wherein the flour contains about 10 to about 25 wt. % urad legumes.

14. A process according to claim 10 wherein the quantity of water is no more than 30 wt. % of the dough.

15. A process according to claim 10 wherein the subdividing of step (b) is conducted by passing the dough through a ball mill, a hammer mill or through rollers.

16. A process according to claim 10 wherein the pasta shape and the pasta product is spaghetti, linguini, ziti, ravioli or tortellini.

17. A pasta product comprising urad legumes in flour form, sufficient water to produce a pasta product and containing no wheat flour or additives other than preservative or flavoring additives.

18. A pasta product according to claim 17 additionally containing any one of the following, in flour form:
   (a) a non-urad legume or a mixture of non-urad legumes, or
   (b) a non-wheat cereal grain or a mixture of non-wheat cereal grains, or
   (c) a mixture of (i) a non-urad legume or a mixture of non-urad legumes and (ii) a non-wheat cereal grain or a mixture of non-wheat cereal grains,
wherein at least about 10 wt. % of the total flour is urad legume flour.

19. A pasta product according to claim 18 wherein about 10 to about 25 wt. % of the total flour is urad legume flour.

20. A pasta product prepared according to the process of claim 1.

21. A pasta product prepared according to the process of claim 2.

22. A pasta product prepared according to the process of claim 3.

23. A pasta product prepared according to the process of claim 8.

24. A pasta product prepared according to the process of claim 9.

25. A pasta product prepared according to the process of claim 10.

26. A pasta product prepared according to the process of claim 11.

27. A pasta product prepared according to the process of claim 12.

28. A pasta product prepared according to the process of claim 15.

29. A pasta product prepared according to the process of claim 16.

* * * * *

UNITED STATES PATENT AND TRADEMARK OFFICE
CERTIFICATE OF CORRECTION

PATENT NO. : 5,087,470
DATED : February 11, 1992
INVENTOR(S) : Anand Sarabhai It is certified that error appears in the above-identified patent and that said Letters Patent is hereby corrected as shown below:

Column 2, line 1: after "significantly" insert --improved by additions of alginates to the vegetable pasta--

Signed and Sealed this

Twenty-second Day of June, 1993

Attest:

MICHAEL K. KIRK

Attesting Officer

Acting Commissioner of Patents and Trademarks